United States Patent
Johansson

(10) Patent No.: US 6,507,420 B1
(45) Date of Patent: Jan. 14, 2003

(54) DEVICE AND METHOD FOR ASCERTAINING NOISE POWER

(75) Inventor: Bengt Johansson, Hägersten (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/720,668

(22) PCT Filed: Jun. 22, 1999

(86) PCT No.: PCT/SE99/01121

§ 371 (c)(1),
(2), (4) Date: Jun. 19, 2001

(87) PCT Pub. No.: WO00/02331

PCT Pub. Date: Jan. 13, 2000

(30) Foreign Application Priority Data

Jul. 3, 1998 (SE) ................................................ 9802391

(51) Int. Cl.[7] .............................................. H04B 10/08
(52) U.S. Cl. ..................................... 359/110; 359/337.2
(58) Field of Search ............................... 359/110, 337.2, 359/341.4

(56) References Cited

U.S. PATENT DOCUMENTS

| | | | | |
|---|---|---|---|---|
| 4,947,459 A | * | 8/1990 | Nelson et al. | 359/110 |
| 5,117,303 A | * | 5/1992 | Desurvire et al. | 359/179 |
| 5,500,756 A | * | 3/1996 | Tsushima et al. | 359/110 |
| 5,513,029 A | * | 4/1996 | Roberts | 359/110 |
| 5,521,751 A | * | 5/1996 | Aida et al. | 359/110 |
| 5,534,996 A | * | 7/1996 | Mori et al. | 356/218 |
| 5,596,440 A | * | 1/1997 | Patz et al. | 356/73.1 |
| 5,654,816 A | * | 8/1997 | Fishman | 359/177 |
| 5,696,707 A | * | 12/1997 | Hentschel et al. | 359/110 |
| 5,768,312 A | * | 6/1998 | Imamura | 359/110 |
| 5,859,716 A | * | 1/1999 | O'Sullivan et al. | 359/110 |
| 6,008,916 A | * | 12/1999 | Khaleghi | 359/110 |
| 6,108,113 A | * | 8/2000 | Fee | 359/110 |

FOREIGN PATENT DOCUMENTS

| | | | | |
|---|---|---|---|---|
| EP | 0486205 A2 | * | 5/1992 | .......... H04B/10/16 |
| EP | 0594178 A1 | | 4/1994 | |
| EP | 0667688 A1 | * | 8/1995 | .......... H04B/10/08 |
| JP | 404181210 A | * | 6/1992 | ............. G02F/1/00 |
| JP | 405257177 A | * | 10/1993 | ............. G02F/1/35 |
| JP | 408248454 A | * | 3/1995 | ............. G02F/1/35 |
| JP | 408114528 A | * | 5/1996 | .......... G01M/11/00 |
| JP | 409054013 A | * | 2/1997 | .......... G01M/11/00 |
| JP | 409214035 A | * | 8/1997 | ............. H01S/3/10 |
| JP | 409246628 A | * | 9/1997 | ............. H01S/3/00 |
| JP | 11064163 A | * | 3/1999 | .......... G01M/11/00 |
| SE | 506403 | | 12/1997 | |
| WO | WO98/11681 | | 3/1998 | |
| WO | WO99/21302 | | 4/1999 | |

OTHER PUBLICATIONS

Gawthorp, Peter. 'Getting the Best out of PID in Machine Control', Digest No. 1996/287, IEEE Colloquium, 1996.*
Bass et al. Handbook of Optics. McGraw–Hill. 1995. pp. 42.3–42.9.*

* cited by examiner

Primary Examiner—Thomas H. Tarcza
Assistant Examiner—Deandra M. Hughes

(57) ABSTRACT

The invention relates to a method and to an arrangement for estimating total noise power ($k \cdot P\lambda$) at a specified point in a WDM-system which includes a predetermined number of amplifiers (51), and which is designed to transmit data in channels at mutually different signal wavelengths within a specific wavelength region. The method comprises the steps of: measuring total optical power ($P_{outtot}$) at said specific point. Filtering wavelength power ($P\lambda$) out from the total optical power ($P_{outtot}$) at a given measuring wavelength ($\lambda m$) within the transmitted wavelength range but outside the signal wavelength. The wavelength power ($P\lambda$) is multiplied by a constant ($k$) which gives the total noise power ($k \cdot P\lambda$) at said specified point.

18 Claims, 7 Drawing Sheets

DEVICE AND METHOD FOR ASCERTAINING NOISE POWER

FIELD OF INVENTION

The present invention relates to an arrangement and to a method for estimating the total noise power at a point in a WDM-system, and in particular for calculating signal output power, i.e. the total optical output power in the absence of noise, from an optical amplifier with the aid of said total noise power, and to use the signal output power to control the channel output power from the amplifier.

DESCRIPTION OF THE BACKGROUND ART

As the term implies, Wave Division Multiplexing (WDM) indicates the use of the wavelength domain to increase the information capacity of an optical fibre, in addition to using the time domain. In other words, several different adjacent wavelengths are used to transfer information between network nodes instead of using a single wavelength as in traditional cases. This enables the information carrier capacity to be increased significantly. The signal at each wavelength is sent through the fibre, independent of the other signals, so that the signal will represent a discrete channel of large bandwidth at each wavelength. Capacity depends on the bandwidth of individual channels and on the number of wavelength channels used.

When signals are transmitted over long distances, it is necessary to regenerate or amplify the signals at regular intervals. Optical fibre amplifiers may be used in the case of this latter alternative, these amplifiers possibly comprising an erbium-doped optical fibre that is pumped by a high power semiconductor laser, hereinafter referred to as a pump laser.

The optical amplifier differs from its electric counterpart in that the output power of the optical amplifier is practically constant when the amplifier is in a saturated state, whereas the electrical amplifier has constant amplification. A constant output power presents problems if the number of channels is changed/changes—either intentionally or unintentionally (malfunctioning). It may therefore be desirable to enable the output power to be controlled. The output power of the optical amplifier, and therewith its amplification factor, can be controlled by adjusting the power of the pump laser.

Swedish Patent Specification SE 506403 teaches how this can be achieved with a feedback control circuit in which the channel output power from the amplifier is used as a real value and compared with the desired channel output power, whereafter the error is returned to the pump laser, which duly changes its output power, and therewith also the output power of the amplifier, in accordance with the error.

Swedish Patent Application SE 9703000-1 (unpublished at the time of filing the present patent application) teaches how the channel output power can be obtained in the present context by dividing the total output power of an amplifier by the number of channels that pass through said amplifier. The number of channels is achieved by sending channel number information in a monitoring channel and by adjusting the information in each node, by adding the number of added channels and subtracting the number of dropped channels.

One problem with this solution is that the total output power will contain a certain amount of noise irrespective of how the output power is measured, this noise usually being referred to as ASE-noise (Amplified Spontaneous Emission). This noise is generated primarily in the optical amplifiers. When a plurality of amplifiers are mutually connected one after the other and when the number of channels is small and/or the amplifier input signals are low, the ASE-noise can result in erroneous calculation of the channel output power.

Consequently, the most critical time of a WDM-system is the start-up time, since start-up is normally effected with one channel. In this case, the error may be in the order of magnitude of some dB:s after the signal has passed through a number of amplifiers. The error decreases significantly when the second channel is added and may be tolerable in the case of small networks that include up to ten nodes. However, in the case of point-to-point applications where the distance between the nodes, and thus also between the amplifiers, is greater and the amplifier input signal thus has a lower input power, the output power error will be significant.

Attempts to measure or calculate the ASE-noise have, of course, been made. European Patent Application EP 0 594 178 teaches a single-channel system in which the noise factor, i.e. the added noise in dB:s, is calculated in an amplifier. Downstream of each amplifier in the system there is placed a first bandpass filter which filters out the noise propagated outside the signal wavelength (propagating ASE), i.e. the total noise that has been generated in several amplifiers. Light is tapped off into a second bandpass filters at a point between the amplifier and the first bandpass filter, this second bandpass filter having a wavelength which differs substantially from the signal wavelength. Since this implies that another amplifier that has a corresponding first bandpass filter is located upstream of the first-mentioned amplifier, the light tapped into the second bandpass filter will only contain propagated noise with wavelengths around the signal wavelength, and consequently the propagated noise will be filtered out in this second bandpass filter.

Consequently, the light exiting from the second bandpass filter will be proportional solely to the noise that has been generated in the nearest amplifier. The amplifier input and output powers are then measured and the measurements used to calculate the noise factor, with the aid of a complicated formula.

SUMMARY OF THE INVENTION

One problem with the invention described in the aforesaid European Patent Application EP 0 594 178 is that it is not very successful in calculating the channel output power in a WDM-system. This is because if a corresponding first bandpass filter is placed around the wavelengths used in a system that includes several wavelengths, a great deal of the noise propagated between the wavelengths would remain, and since the propagated noise is greater than the noise generated in a single amplifier it would not be particularly useful to calculate the generated noise and subtract solely this noise.

The object of the present invention is to estimate the total noise, i.e. generated noise plus propagated noise, at a point in a WDM-system and primarily at the outlet of an optical amplifier.

Another object of the invention is to use the estimated total noise to calculate the signal output power of an amplifier, i.e. the total output power without noise.

A third object is to use the signal output power to control amplifier channel output powers.

These objects are achieved and problems associated with present technology are solved by realising that the total noise can be estimated as a constant multiplied by the power at a measuring wavelength which is not one of the signal wavelengths but which nevertheless lies within the wavelength band transmitted between the various nodes. The signal output power from an amplifier can then be obtained by reducing the total output power of the amplifier by the constant multiplied by the amplifier output power at said measuring wavelength.

The best optimisation is obtained by choosing the constant experimentally for each amplifier, by activating the amplifier in the system although without transmitting any signal power, and thereafter adjusting the constant until the total output power of the amplifier minus the constant multiplied by the amplifier output power at said measuring wavelength is equal to zero. Experiments have shown that the noise also increases with amplification, and consequently the most optimal procedure is one which also takes amplification into account when adjusting the constant.

However, in the majority of cases, a sufficiently good result is achieved even with a general compensation while using a constant that is chosen conventionally for several amplifications.

One advantage afforded by the invention is that the noise can be estimated in a very simple and inexpensive way.

In one embodiment, the signal output power is used to control the channel output power from an amplifier. This is achieved by dividing the signal output power by the number of channels that pass through the amplifier, so as to obtain a mean channel signal output power, which is consequently noise compensated and which can be used to control the amplifier, as described in Swedish Patent Application SE 9703000-1.

The advantage is that this control of the amplifier is more precise and more reliable than when no compensation for noise is made.

DETAILED DESCRIPTION OF PREFERRED EMBODIMENTS

Figure 1:
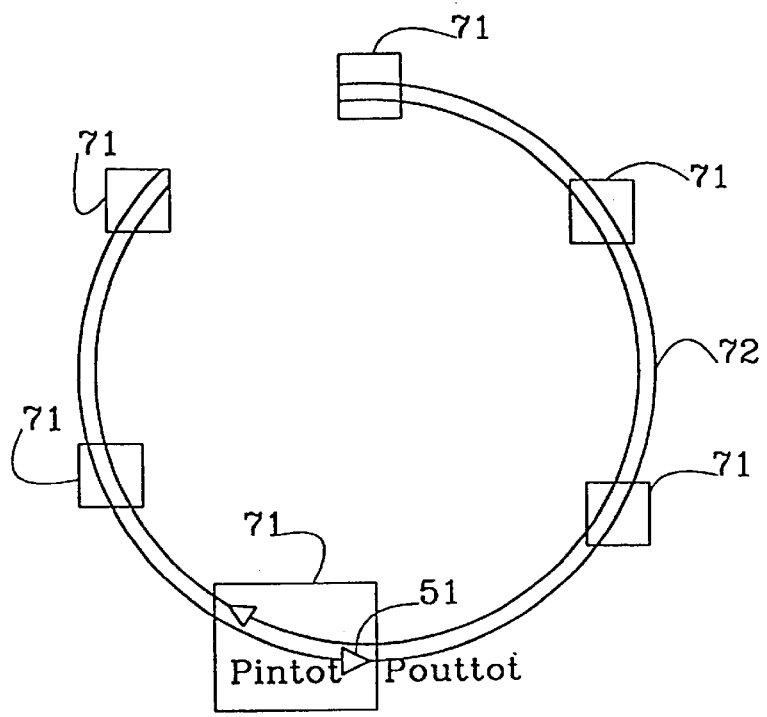
FIG. 1 is a general illustration of the possible appearance of a WDM-system.

FIG. 1 is a schematic and synoptic illustration of a possible configuration of a WDM-system (Wavelength Division Multiplex). Six nodes 71 are interconnected by a bi-directional bus 72. Each node includes at least one amplifier 51 that has a total input power $P_{intot}$ and a total output power $P_{outtot}$. Other features in the nodes 71 may vary, and are therefore not shown. A node 71 may include more than one amplifier 51 and amplifiers 51 may also be located between the nodes 71.

There are many instances when it is desirable to be able to measure or calculate the ASE-noise (Amplified Spontaneous Emission) in a WDM-system. One example is the desire to simply check signal quality, by observing the noise levels in the system. Another example is the desire to be able to compensate out signal noise or to make different types of calculations and controls.

It ought to be possible to measure the ASE-noise, although this would probably be expensive. It should also be possible to calculate the ASE-noise that is generated in a specific amplifier, on the basis of the amplification and noise factor of the amplifier, although this would not work when several amplifiers are disposed in mutually sequential relationship. Instead, the invention utilises a method of estimating the noise.

Figure 2:
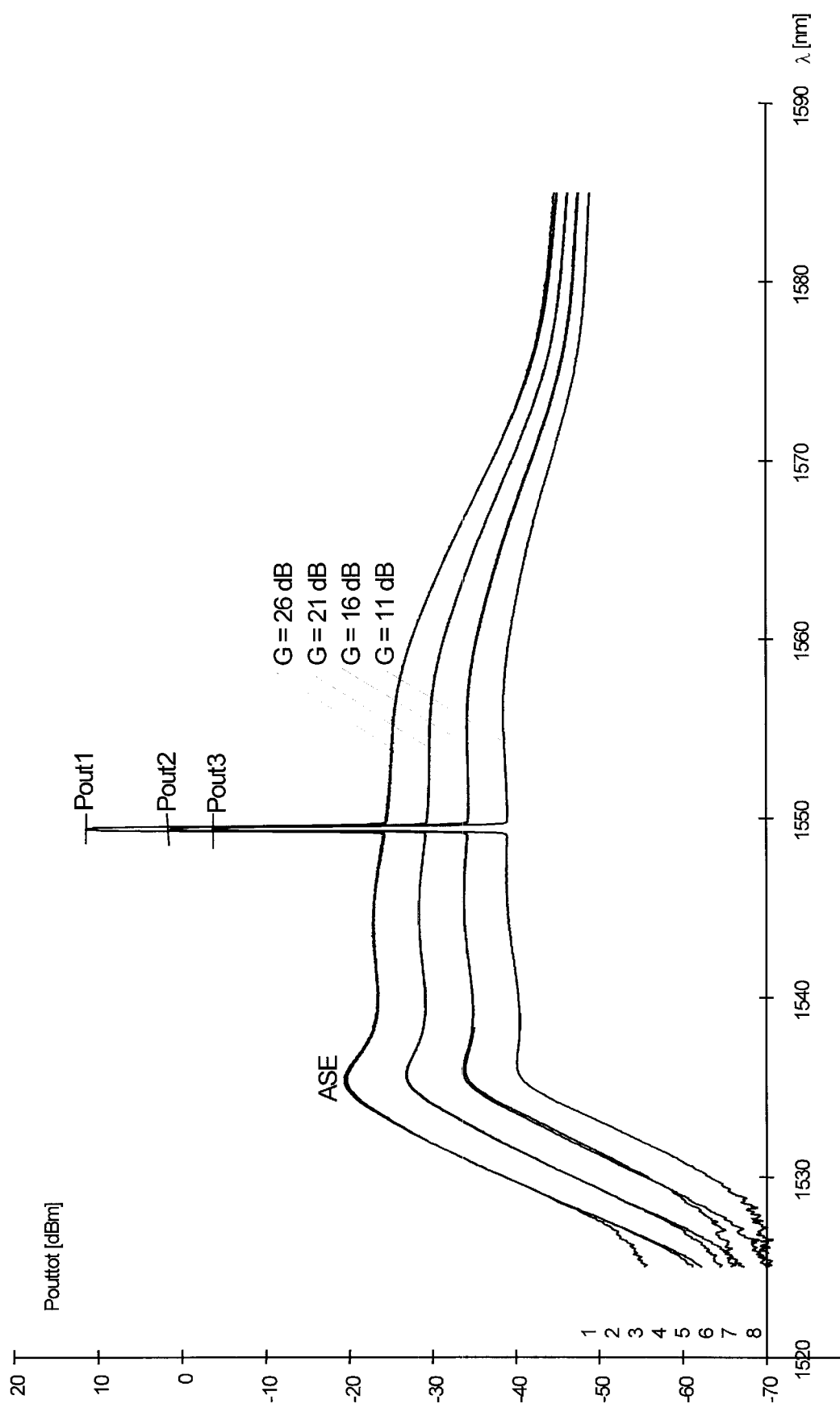
FIG. 2 is a diagrammatic illustration of the total output power from an amplifier as a function of wavelength, measured at different input powers and amplifications and having one channel at 1550 nm.

FIG. 2 is a diagram which shows measured curves that present the output power $P_{outtot}$ from the optical amplifier 51 as a function of different wavelengths λ, where a channel having a wavelength of 1550 nm is transmitted. The curves are measured with a bandwidth of 0.1 nm. The amplifier includes a filter for wavelengths below 1530 nm, which explains the initial appearance of the curves and which is not actually relevant in the present context. For the purpose of illustrating the theory, it is assumed in FIGS. 2 and 3 that only one amplifier is coupled in the system.

Of the three uppermost curves 1, 2, 3, which essentially coincide, curve 1 represents an input power of −15 dBm and an output power $P_{out1}$ of 11 dBm at the wavelength 1550, curve 2 represents an input power of −25 dBm and an output power $P_{out2}$ of 1 dBm at said wavelength of 1550 nm, and curve 3 represents an input power of −30 dBm and an output power $P_{out3}$ of 4 dBm at said wavelength, i.e. an amplification of 26 dB is obtained in all three cases. Theoretically, these three curves 1, 2, 3 should only show a peak $P_{out1}$, $P_{out2}$, $P_{out3}$ of 11 dBm, 1 dBm and 4 dBm respectively at the wavelength of 1550 nm. The remainder is ASE-noise that has been generated in the amplifier and that is at most −20 dBm per 0.1 nm.

Thus, FIG. 2 shows that the ASE-noise is proportional to amplification. Despite the differences in respective input and output powers represented by the three uppermost curves 1, 2, 3, the level is, in principle, the same with the exception of the actual peaks. The peak value $P_{out1}$, $P_{out2}$, $P_{out3}$ cannot easily be read from the curves and has therefore been marked in the FIG., although it is the noise that is the important feature in the present context.

The proportionality is also evident from the following curves: The following two curves 4, 5 are measured at an input power of −20 dBm and −25 dBm respectively, and a respective output power of +1 dBm and 4 dBm, which results in an amplification of G=21 dB. The next pair of curves 6, 7 have been measured at a respective input power of −15 dBm and −20 dBm, and a respective output power of +1 dBm and 4 dBm, which results in an amplification of G=16 dB. The lowermost curve 8 has been measured at an input power of 15 dBm and an output power of −4 dBm, which results in an amplification of G=11 dB. It is clearly shown that noise increases with increased amplification, regardless of the input and output powers of the signal.

Figure 3:
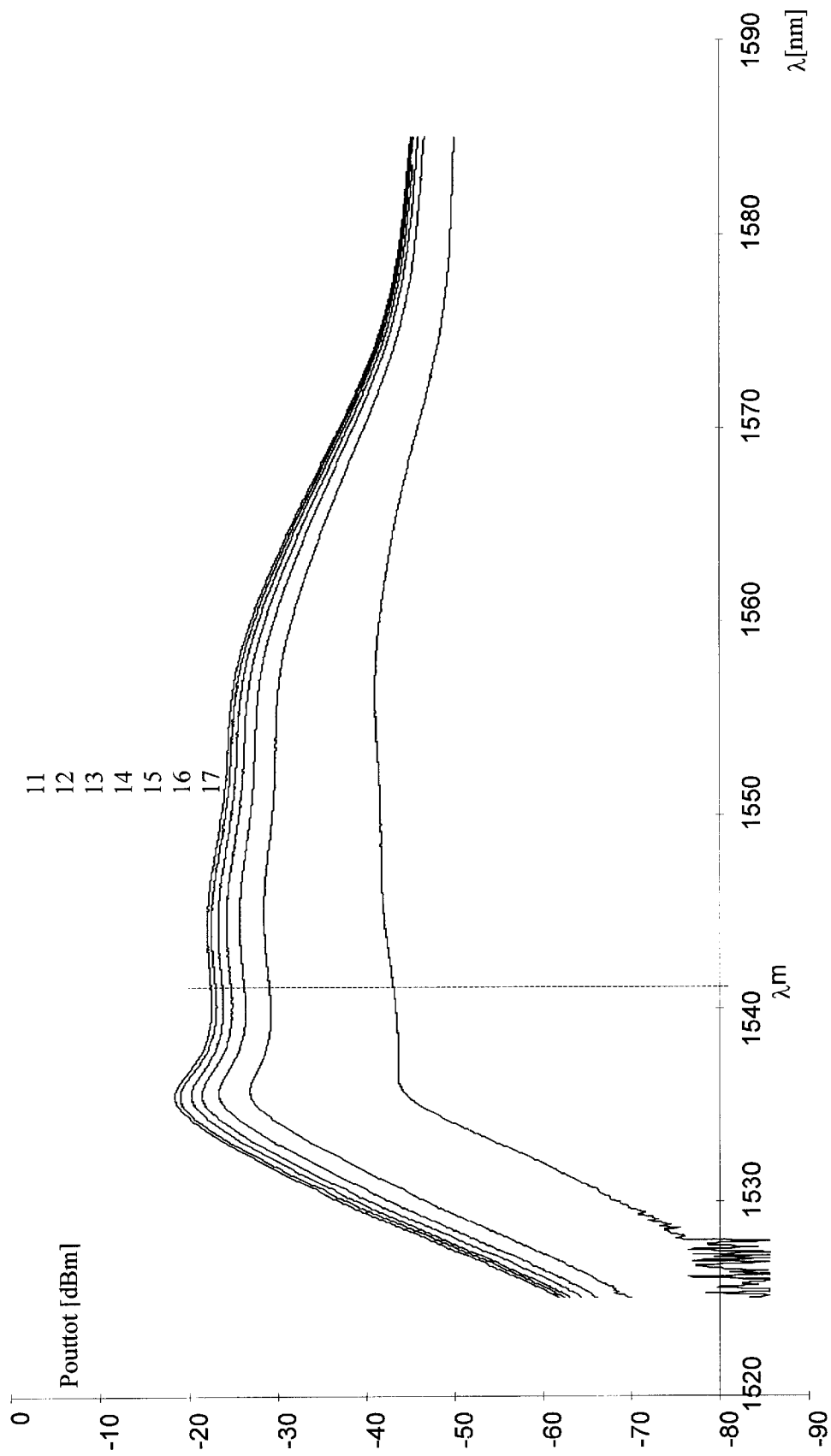
FIG. 3 is a diagrammatic illustration showing x- and y-axes corresponding to FIG. 1, but without showing amplifier input power, i.e. only noise is shown.

The diagram of FIG. 3 is essentially the same as the diagram of FIG. 2, although the amplifier lacks an input signal. The various curves 11, 12, 13, 14, 15, 16, 17 have been measured for different pump currents, reading from the top down pump currents of 80, 70, 60, 50, 40, 30, 20 mA, which corresponds to different amplifications. The squiggles seen at the beginning of the lowermost curve 17 are due to the fact that they lie on the border of what can be measured and thus lack significance in this context.

FIGS. 2 and 3 both show that the noise power in respect of a specific pump current is roughly constant within a broad wavelength range $\lambda = \approx 1538–1562$ nm. This makes it suitable to measure the noise level somewhere within this wavelength range, although with the exception of those wavelengths that are used to transmit data in channels, i.e. the signal wavelengths. For example, a number of signal wavelengths may lie between 1545 and 1559 nm, whereas the measuring range lies at $\lambda_m \approx 1540–1542$ nm. It is, of course, possible to measure the noise level somewhere between the channels, provided that the channels are not too densely packed.

Consequently, the total signal output power $P_{out}$ could be calculated in accordance with the present invention with the aid of the formula:

$$P_{out} = P_{outtot} - k \cdot P_\lambda \quad (1)$$

where $P_{outtot}$ is the total output power including noise, $P_\lambda$ is the power at a given measuring wavelength $\lambda_m$, e.g. 1541 nm according to FIG. 3, and k is a constant. The best optimisation is determined by choosing the constant k experimentally for each amplifier, by coupling the amplifier in the system but without transmitting any signal power, as in the case of FIG. 3, and thereafter adjusting the constant until the total output power $P_{outtot}$ of the amplifier minus the constant k multiplied by the amplifier output power $P_\lambda$ at said measuring wavelength $\lambda_m$ is equal to zero. Since the constant k also varies with the amplification or gain, the absolute best way is to also take this into account when adjusting the constant.

Will this also work for cascade-coupled amplifiers, i.e. in a system that includes more than one node? The answer is Yes. Experiments have shown that when curves corresponding to those in FIGS. 2 and 3 are compiled for more than one amplfier, the curves will have an appearance similar to that in FIGS. 2 and 3, although with higher noise power levels of course. Each amplifier adds roughly the same amount of noise, and the noise power consequently increases proportionally to the number of amplifiers used. This is apparent from FIG. 5, which will be described further on in the description.

Figure 4:
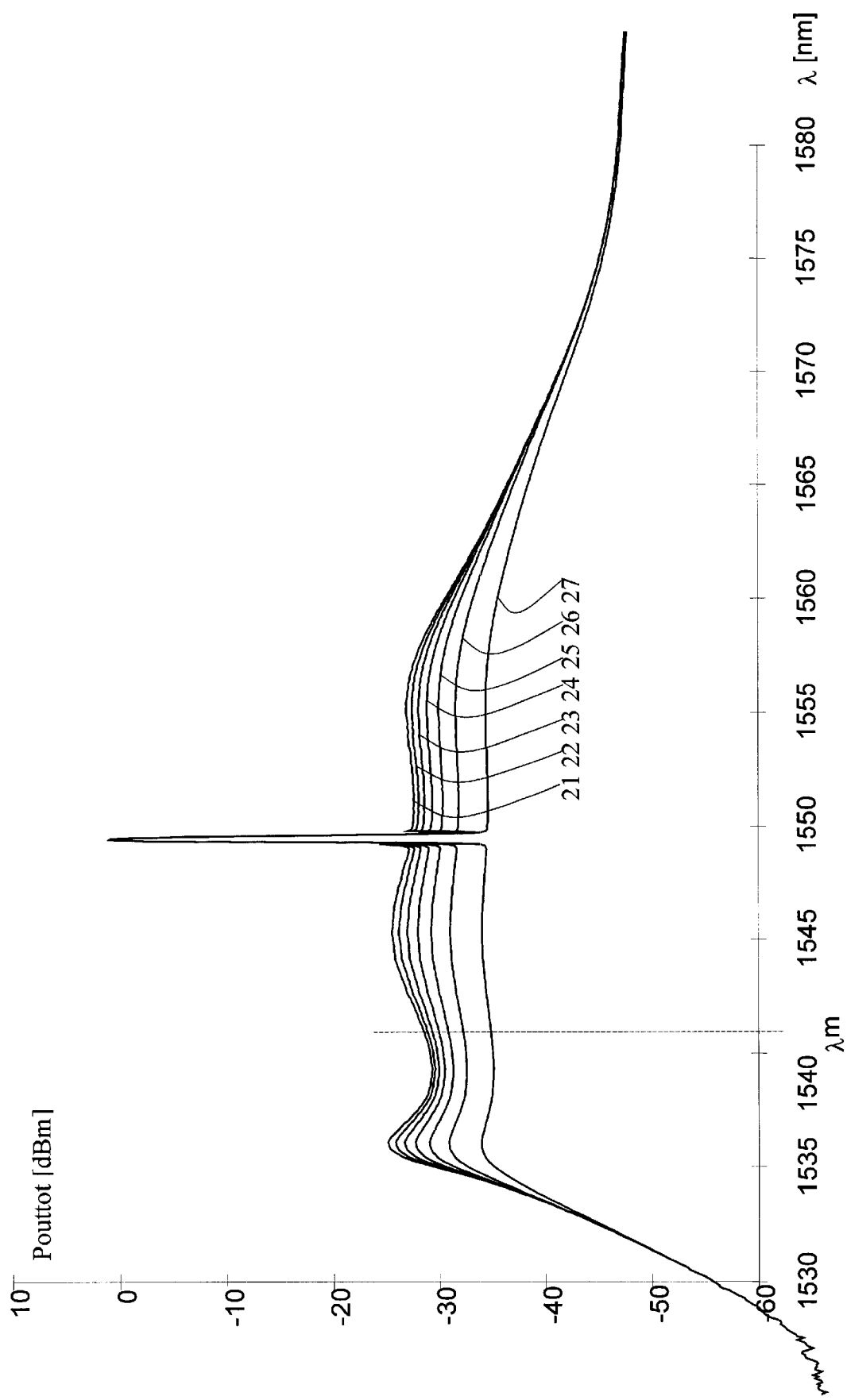
FIG. 4 is a diagram in which the x- and y-axes correspond to FIG. 1 and which shows an input power of −15 dBm and an amplification of 16 dB with a compensation according to the invention optimised for an amplification of 16 dB. The various curves represent 1–7 series-connected amplifiers.

FIG. 4 is a diagrammatic illustration of the total output power $P_{outtot}$ as a function of wavelength $\lambda$ at an amplification of 16 dB and an input signal having an input power of −15 dBm at $\lambda=1550$ nm and including a compensation circuit according to the relationship (1) optimised for an amplification of 16 dB. The lowermost curve 27 applies to a lone amplifier, the lowest penultimate curve 26 applies to two cascade-coupled amplifiers, and so on as at 25, 24, 23, 22 up to the uppermost curve 21, which applies to seven cascade-coupled amplifiers. Compensation is effected with the aid of a power measurement at a measuring wavelength $\lambda_m \approx 1540–1542$ nm.

If instead an amplification of 25 dB is used in each amplifier with an compensation optimised for an amplification of 16 dB, the curves would not be as horizontal as those in FIG. 4 and the estimation of the noise power would thus not be as reliable. Consequently, the compensation would not be as good as that in respect of the amplifiers in FIG. 4, although the result achieved when compensating for erroneous amplification would nevertheless be far better than when no compensation at all is made.

Figure 5:
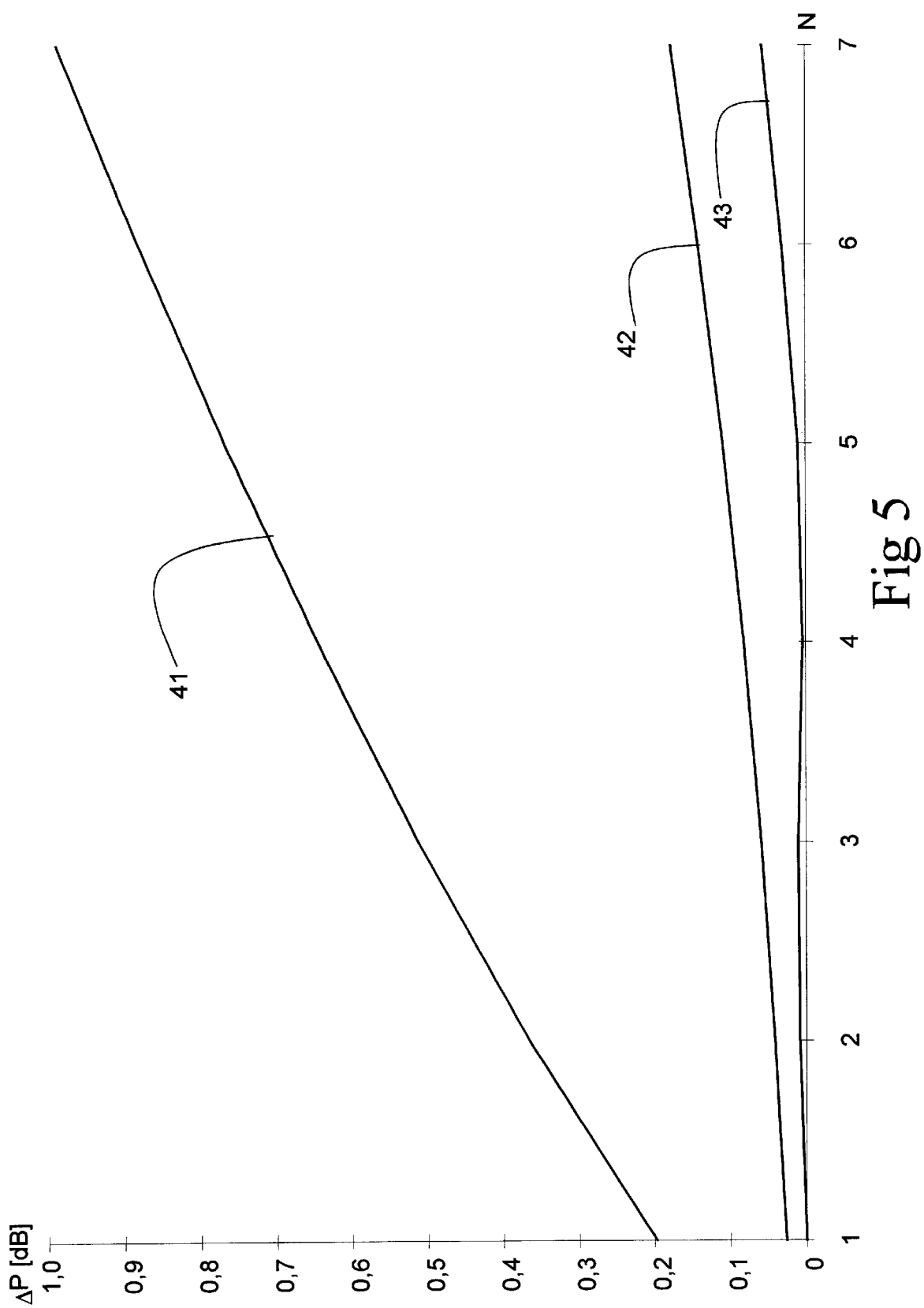
FIG. 5 is a diagrammatic illustration of the error between a calculated or total output power and a real output power in respect of no compensation, general compensation and amplification optimised compensation.

FIG. 5 is a diagrammatic illustration of the absolute value of errors in calculated output powers $\Delta P$ in dB as a function of the number N of series-connected amplifiers. The curves are computed at an amplification of 16 dB and an input power of −15 dBm for one channel. The uppermost curve 41 shows how large the error becomes in the absence of a compensation circuit, i.e. the difference between output power together with noise and without noise. After seven amplifiers, the error is in the region of 1 dB. The error would have been even greater if the amplification had been larger.

The centremost curve 42 shows how large the error becomes when using a compensation circuit in accordance with the relationship (1) with the constant k optimised in a typical or stereotype fashion for all amplifications, i.e. the curve shows the difference between calculated output power compensated for noise and the true or real output power in the absence of noise. Correspondingly, the lowermost curve 43 illustrates how large the error becomes when using a compensation circuit that functions according to (1) with the constant k optimised for the amplification of 16 dB, i.e. the amplification used. As will be seen, the best result is obtained with a compensation that is optimised for the amplification used in accordance with curve 43, although the result will be far better with a general compensation according to curve 42 than the result obtained when no compensation is used in accordance with curve 41.

It has been shown theoretically hitherto how a measuring wavelength within the transmitted wavelength range but outside the signal wavelengths can be used to estimate the total noise level, and it will now be shown how this theory can be implemented in practice. This is illustrated in FIGS. 6a–d.

FIGS. 6a–d show the optical amplifier 51 having the total input power $P_{intot}$ and the total output power $P_{outtot}$. Part of the light on the output of the amplifier 51 is tapped-off in an optocoupler 52 into a compensation circuit 53. The wavelength power $P_\lambda$ is filtered out in the compensation circuit 53 around a determined measuring wavelength $\lambda_m$ e.g. 1541 nm, with the aid of, for instance, a reflective wavelength-dependent filter 54a, in accordance with FIGS. 6a and 6b, a wavelength division dependent filter 54b, as in FIG. 6c, or a wavelength-dependent bandpass filter 54c together with an optocoupler 61, as in FIG. 6d. The wavelength power $P_\lambda$ is read-off with a photodiode 56 and multiplied by a constant k, either with a variable amplifier 57, as in FIG. 6a, or digitally, as in FIG. 6b, where a microprocessor 60 or some corresponding device is used. The estimated noise power $k \cdot P_\lambda$ is obtained in this way.

The noise power can, of course, be estimated at places in the system other than on the output of an amplifier or amplifier. When only wishing to determine the signal quality in the system, the computed noise level $k \sim P_\lambda$ may, in principle, be read-off anywhere in the system. On the other hand, however, when desiring to compensate amplifier output power for noise, the signal output power $P_{out} = P_{outtot} - k \cdot P_\lambda$ will naturally be calculated in accordance with (1) on the output of said amplifier.

Figure 6A:
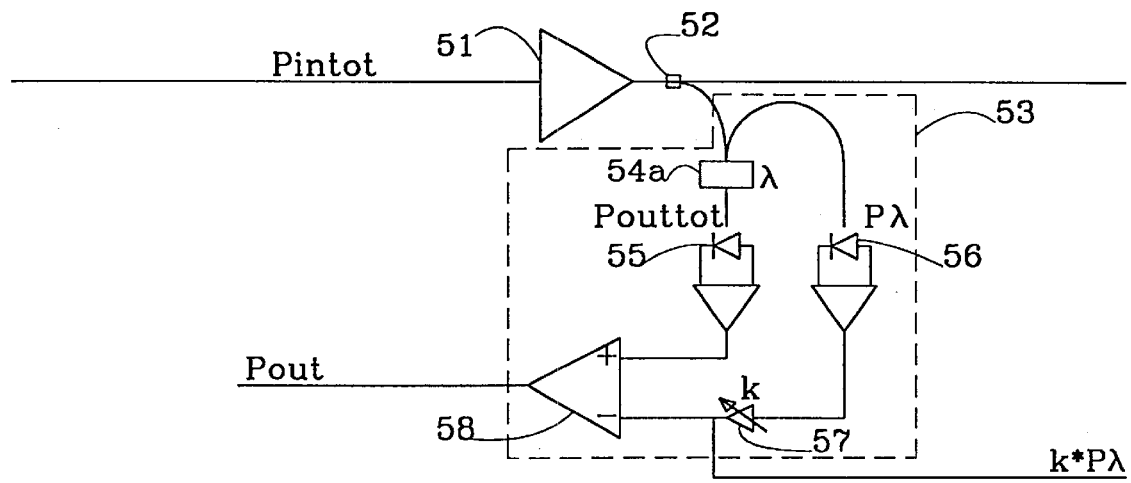
FIGS. 6a–d are schematic illustrations of different embodiments of the invention.

In FIG. 6a, the signal output power is calculated by reading-off the total output power $P_{outtot}$ with the aid of a photodiode 55 and applying this reading to the positive input of a differential amplifier 58, while applying the calculated noise power $k \cdot P_\lambda$ on the negative input of the same differential amplifier 58. This results in the signal output power $P_{out}=P_{outtot}-k\cdot P_\lambda$ on the output of the differential amplifier 58.

Figure 6B:
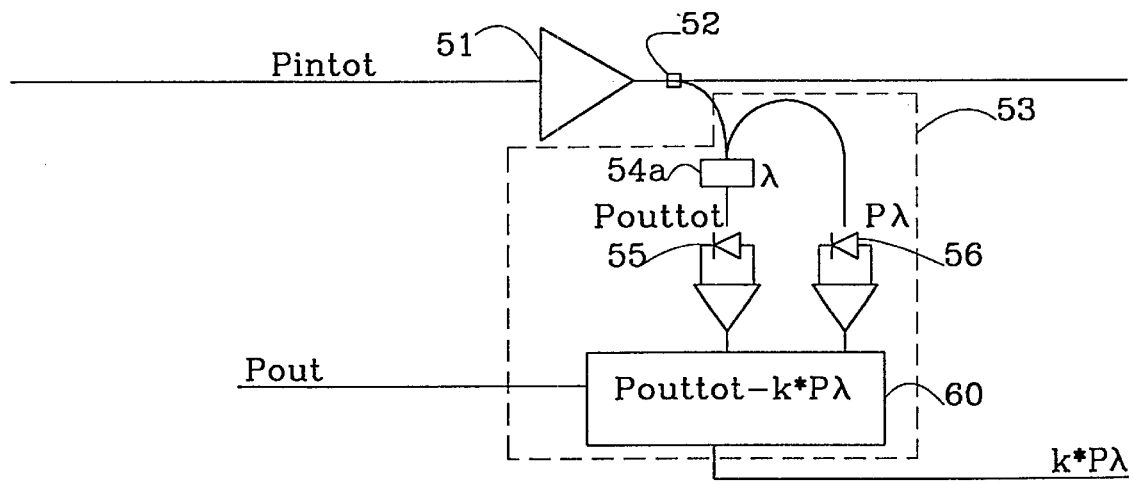
Figure 6C:
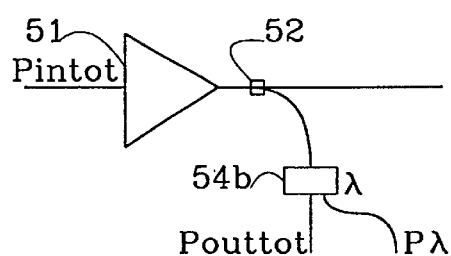
Figure 6D:
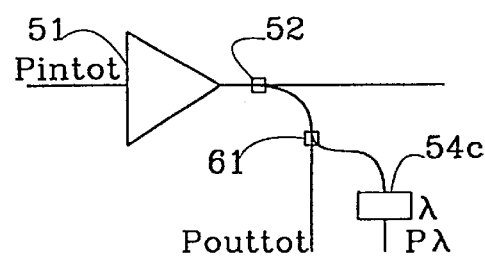

In FIG. 6b, on the other hand the total output power $P_{outtot}$ is read-off by means of the photodiode 55 and entered into the microprocessor 60, whereafter the calculation according to (1) is carried out. In FIGS. 6c and 6d, any one of the embodiments shown in FIGS. 6a and 6b can complement the FIGS. downstream of the filters 54b, 54c.

It may also be desirable to make a reliable calculation of a mean output power on each channel in the absence of noise, which we may refer to as the channel signal output power. This may be needed in order to provide an amplifier control circuit described in the a foregoing under the heading Description of the Background Art. It is then possible to provide a coupling of the kind shown in FIG. 7, for example. An erbium-doped fibre 51 that functions as the optical amplifier is controlled by a pump laser 62. A first detector 63 detects the total optical power $P_{intot}$ on the input of the erbium-doped fibre 51 and sends the detected value to a feed-forward block 64. A feed-forward process demand signal PF is sent from the feed forward coupling block 64 and controls the erbiumdoped fibre 51 by controlling the output power $P_{outtot}$ from the pump laser 62.

The feed-forward block 64 will preferably have a non-linear function with respect to the total optical power and can be implemented with the aid of an analogue non-linear net, for example. Alternatively, implementation can be effected digitally by, e.g., A/D-converting the optical input power to, e.g., an eight-bit word. This eight-bit word can then be used by virtue of the different values of said word pointing to different storage addresses in a memory store.

Figure 8:
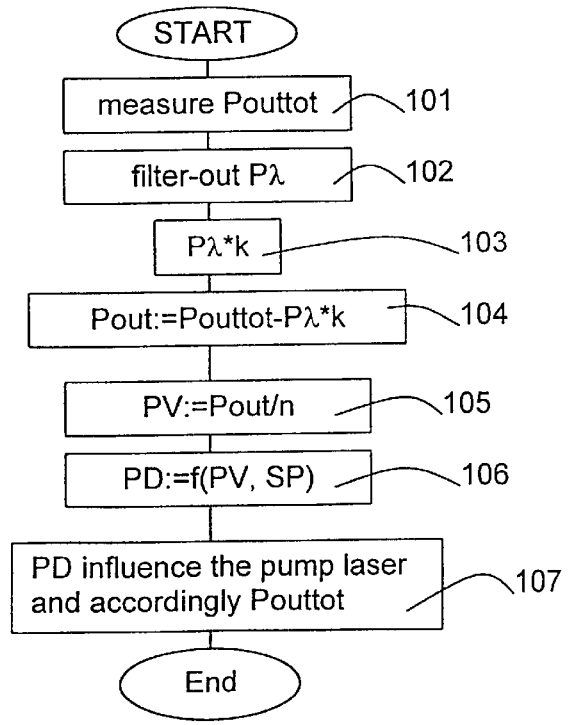
FIG. 8 is a flow sheet illustrating the example in FIG. 7.

As shown in FIG. 8, the feedback works by measuring the total output power $P_{outtot}$ of the erbium-doped fibre 51, step 101. The signal output power $P_{out}$ is then computed by the inventive compensation circuit 53 by filtering-out wavelength power $P_\lambda$ at a given wavelength, step 102, multiplying said wavelength power $P_\lambda$ by a constant k, step 103, and subtracting the result, which corresponds to the total noise power, from the total output power $P_{outtot}$ step 104, so as to obtain signal output power $P_{out}$. The signal output power $P_{out}$ is applied to a feed-forward block 67 in which the signal output power $P_{out}$ is divided by the number of channels n, step 105, therewith generating a process value PV in the form of said channel signal output power. The process value PV is compared in a controller 65 with the desired channel output power, i.e. with a set point value SP, step 106. In accordance with its program, the controller 65 transmits a feedback process demand signal PB, step 107, which controls the output power of the erbium-doped fibre 51 through the medium of the pump laser 62, which, in turn, influences the channel powers of the amplifier, so as to bring the mean channel output power closer to the desired channel output power.

By way of an equivalent alternative, the signal output power $P_{out}$ may, of course, be used as the process value PV while obtaining the set point value SP as the desired channel signal output effect multiplied by the number of channels.

It will be understood that the adjustment does not take place instantaneously. When the feedback process demand signal PB changes, the channel output power of the erbium-doped fibre 51, it is possible that the conditions have already been changed and therewith require a new measurement of the channel output power of the erbium-doped fibre 51, which in turn results in a new feedback process demand signal PB. This process takes place continuously and a negative feedback control circuit is obtained which adjusts the output power of the erbium-doped fibre 51 with a certain time shift, so that said output power will always lie in the proximity of the desired value.

The use of a feed-forward control results in a rapid adjustment, since it enables interference and disturbances to be adjusted immediately. However, the use of a feed-forward control also requires thorough knowledge of the system, because the result is not seen. This can be compared with driving an automobile blindfolded; it must be known precisely how the steering wheel shall be turned in negotiating each curve so as not to end up in a ditch.

On the other hand, negative feedback is reliable because it is possible to look at the result and to make subsequent changes. The drawback with negative feedback is that the automatic adjustment cannot be made at any speed whatsoever, since the adjustment would then be in danger of becoming unstable. In this case, the optical amplifier also includes a time constant of about 2–3 ms that places a limit on the speed at which the feedback adjustment can be made. On the other hand, by combining feedback with feed-forward a rough adjustment can be made quickly with the aid of the feed-forward process and a fine adjustment made with the aid of the feedback process, although this fine adjustment will not be quite as quick.

Figure 7:
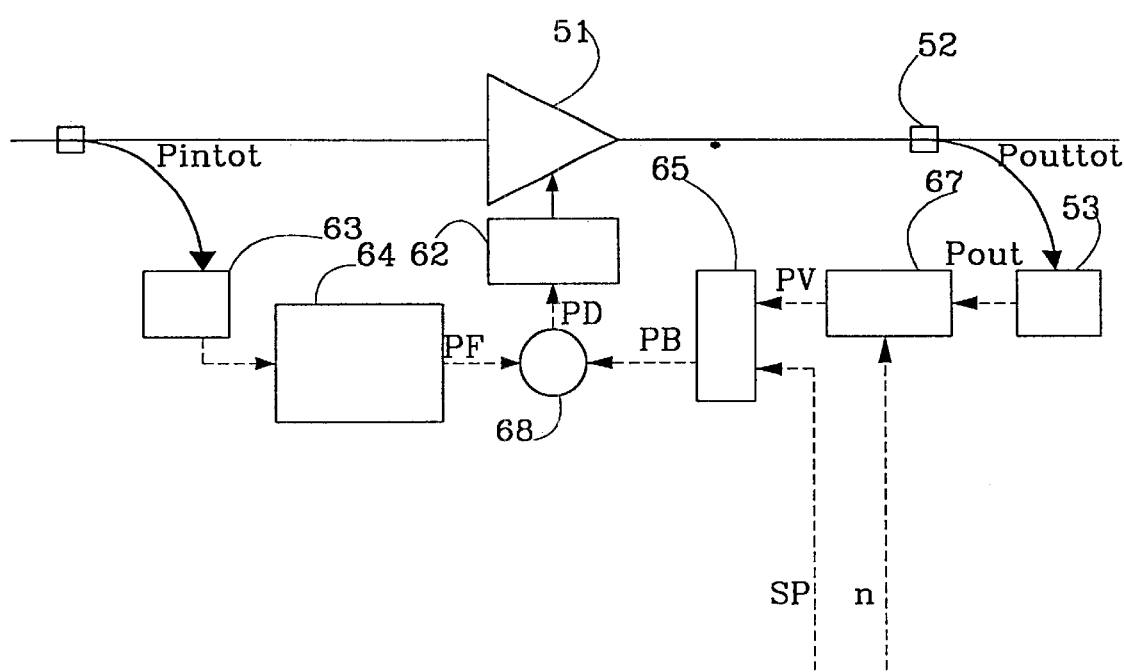
FIG. 7 is a schematic illustration of one example in which the invention is applied for channel power regulation.

FIG. 7 also shows a combination device 68 which combines the feed-forward output signal PF with the feedback output signal PB and delivers an output signal PD for controlling the pump laser 62. The combination device may be an adder or a multiplier, although other combination functions are conceivable.

The feedback block 67 may receive, e.g., from a central unit (not shown) information that reveals the number of channels n that pass through the amplifier or amplifier 51, and possibly some type of triggering signal and/or inhibiting signal that indicates when updating of the channel number n is allowed or not allowed.

The set point value SP can be set by the central unit (not shown). The feedback and feed-forward circuits may also be used separately.

The measuring of signal quality and the improved calculation of the channel output power, e.g. for adjustment purposes, are, of course, only a few of the fields of application in which the estimation of noise power is beneficial. The person skilled in this art will be aware of several areas applicable in this context.

What is claimed is:

1. A method of estimating total noise power ($k\cdot P_\lambda$) at a specific point in a WDM-system that includes a predetermined number of amplifiers, in which system data is transmitted in channels of mutually different signal wavelengths within a specified wavelength range, said method comprising the steps of:

measuring total output power ($P_{outtot}$) at said specific point in said system;

filtering a wavelength power ($P_\lambda$) from the total output power ($P_{outtot}$) at a given measuring wavelength ($\lambda_m$) within the transmitted wavelength range but outside a signal wavelength; and multiplying the wavelength power ($P_\lambda$) by a constant (k) which gives the total noise power ($k\cdot P_\lambda$) at said specific point.

2. A method of generating a signal output power ($P_{out}$), i.e. the total output power without noise, from an amplifier in a WDM-system that includes a predetermined number of amplifiers, said system transmitting data in channels of mutually different signal wavelengths within a specified wavelength range, said method comprising the steps of:

measuring total output power ($P_{outtot}$) at an output of the amplifier;

filtering the wavelength power ($P_\lambda$) from the total output power ($P_{outtot}$) at a given measuring wavelength ($\lambda_m$) within the transmitted wavelength range but outside the signal wavelength;

multiplying the wavelength power ($P_\lambda$) by a constant (k) which gives total noise power (k·$P_\lambda$) at the amplifier output; and generating the signal output power ($P_{out}$) as a difference between the total output power ($P_{outtot}$) and the total noise power (k·$P_\lambda$).

3. A method relating to a WDM-system that includes a predetermined number of optical amplifiers for adjusting channel power of one of said optical amplifiers with the aid of an output signal (PB), said optical amplifier including at least one input and at least one output, by using a negative feedback control circuit that includes a controller and a compensation circuit, wherein the method comprises the steps of:

measuring total output power ($P_{outtot}$) at an output of the amplifier;

filtering a wavelength power ($P_\lambda$) from the total output power ($P_{outtot}$) at a given measuring wavelength ($\lambda_m$) within the transmitted wavelength range but outside signal wavelengths;

multiplying the wavelength power ($P_\lambda$) by a constant (k) which gives total noise power (k·$P_\lambda$) at the amplifier output;

subtracting the total noise power (k·$P_\lambda$) from the total output power ($P_{outtot}$), which gives the signal output power ($P_{out}$);

using the signal output power ($P_{out}$) to generate a process value (PV) applied to the controller;

using a desired channel output power to generate a set point value (SP) applied to said controller; and causing the controller to deliver the output signal (PB) which changes the output power of said amplifier and therewith a mean channel output power of said amplifier, such as to bring the mean channel output power of the amplifier closer to the desired channel output power.

4. A method according to claim 3, comprising:

allocating the process value (PV) to be the value of the signal output power ($P_{out}$); and allocating the set point value (SP) to be the value of the desired channel output power multiplied by the channel number (n).

5. A method according to claim 3, comprising:

allocating the process value (PV) to be the value of the signal output power ($P_{out}$) divided by the channel number (n); and allocating the set point value to be the value of the desired channel output power.

6. A method according to claim 1, comprising setting the constant (k) on one of the amplifiers by:

refraining from transmitting any of the channels in the system; and adjusting the constant (k) until the total output power ($P_{outtot}$) of the amplifier minus the constant (k) multiplied by the wavelength power ($P_\lambda$) is roughly equal to zero.

7. A method according to claim 6, comprising setting the constant (k) for each amplifier at an amplification intended precisely for each amplifier.

8. A method according to claim 6, comprising setting the constant (k) equal for all amplifiers by adjusting to a value of the constant (k) for different gains or amplifications.

9. An apparatus for calculating total noise power (k·$P_\lambda$) in a WDM-system which includes a predetermined number of amplifiers and which is designed to transmit data in channels of mutually different signal wavelengths within a predetermined wavelength range, said apparatus comprising:

a device for measuring total output power ($P_{outtot}$) at a specific point in the WDM-system;

a filter for filtering wavelength power ($P_\lambda$) from the total output power ($P_{outtot}$) at a given measuring wavelength ($\lambda_m$) within the transmitted wavelength range but outside the signal wavelengths; and a device for multiplying the wavelength power ($P_\lambda$) by a constant (k) which gives the total noise power (k·$P_\lambda$) at said specific point.

10. An apparatus for calculating signal output power, i.e. total output power without noise, from an amplifier in a WDM-system which is designed to transmit data in channels of mutually different signal wavelengths within a predetermined wavelength range, said apparatus comprising:

a device for measuring total output power ($P_{outtot}$) at the output of the amplifier;

a filter for filtering wavelength power ($P_\lambda$) from the total output power ($P_{outtot}$) at a given measuring wavelength within the transmitted wavelength range but outside the signal wavelengths;

a device for multiplying the wavelength power ($P_\lambda$) by a constant (k) which gives total noise power (k·$P_\lambda$) at the output of the amplifier; and a device for subtracting the total noise power from the total output power ($P_{outtot}$), which gives the signal output power ($P_{out}$).

11. An apparatus for adjusting the channel output power of an optical amplifier with the aid of an output signal (PB), said amplifier including at least one input and at least one output, said apparatus comprising:

a negative feedback control circuit which includes a controller that is designed to receive a set point value (SP) for desired channel output power and a process value (PV) and to deliver the output signal (PB); and a device for measuring total output power ($P_{outtot}$) at the amplifier output, wherein the negative feedback control circuit includes a compensation circuit which, in turn, includes a filter for filtering wavelength power ($P_\lambda$) from the total output power ($P_{outtot}$) at a given measuring wavelength ($\lambda_m$) within the transmitted wavelength range but outside the signal wavelengths, a device for multiplying the wavelength power ($P_\lambda$) by a constant (k) which gives total noise power (k·$P_\lambda$) at the output of said amplifier, and a device for subtracting the total noise power ($k \cdot P_\lambda$) from the total output power ($P_{outtot}$), which gives a signal output power ($P_{out}$), said signal output power ($P_{out}$) being intended to generate the process value (PV).

12. An apparatus according to claim 11, wherein:

the process value (PV) is equal to the signal output power ($P_{out}$); and the set point value (SP) is equal to the desired channel output power multiplied by the number (n) of channels.

13. An apparatus according to claim 11, wherein:

the process value (PV) is equal to the signal output power ($P_{out}$) divided by the number (n) of channels; and the set point value (SP) is equal to the desired channel output power.

14. An apparatus according to claim 11, wherein the multiplying device is a variable amplifier and wherein the subtraction device is a differential amplifier.

15. An apparatus according to claim 11, wherein the multiplying device and the subtraction device are comprised by a microprocessor.

16. An apparatus according to claim 11, wherein the filter is a reflective wavelength-dependent filter.

17. An apparatus according to claim 11, wherein the filter is a wavelength division dependent filter.

18. An apparatus according to claim 11, wherein the filter is a wavelength dependent filter.

* * * * *